Jan. 31, 1967  P. DOTTER  3,301,095
MULTIPLE SPEED HUB WITH AUTOMATIC SHIFT
Filed Dec. 5, 1963
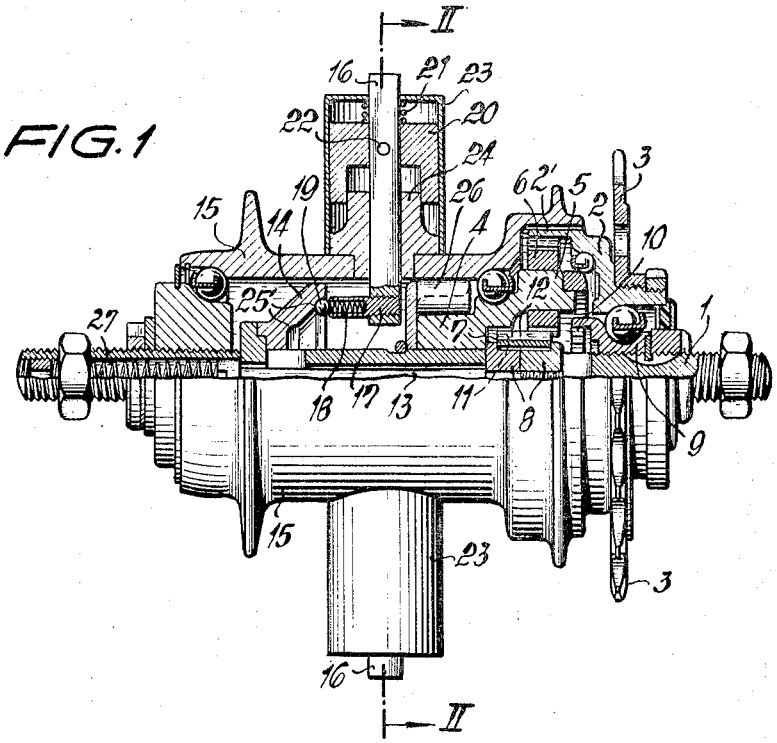
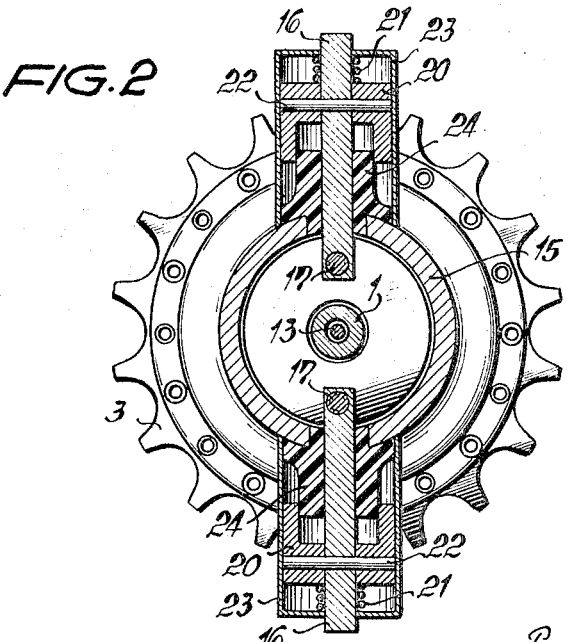
INVENTOR
Paul Dotter
By Richard Low
Ag't

United States Patent Office 3,301,095
Patented Jan. 31, 1967

3,301,095
MULTIPLE SPEED HUB WITH AUTOMATIC SHIFT
Paul Dotter, Schweinfurt am Main, Germany, assignor to Fichtel & Sachs A.G., Schweinfurt am Main, Germany, a corporation of Germany
Filed Dec. 5, 1963, Ser. No. 328,430
Claims priority, application Germany, Dec. 8, 1962, F 38,499
14 Claims. (Cl. 74—752)

This invention relates to multiple speed hubs for bicycles and similar wheeled vehicles that may be pedal or motor operated, and particularly to a multiple speed hub in which the transmission ratio is automatically shifted responsive to the rotary speed of the hub.

It is known to provide rear wheel hubs for bicycles and similar vehicles with multiple speed planetary gearing, and to shift the transmission ratio of the gearing by means of centrifugal weights mounted in the hub shell. The shell diameter cannot be increased beyond narrow limits. Because of the limited space available within the shell the mass of the weights and their radius of rotation are held to values so small as to make only very small forces available for the shifting of the gears.

The crowding resulting in the hub shell from the presence of the centrifugal weights makes it necessary to hold the dimensions of other operating elements at a minimum. The linkage connecting the centrifugal weights to the planetary gearing in conventional automatically shifting multiple-speed hubs thus is limited in its mechanical strength by the small space available.

A primary object of the invention is the provision of a hub of the type described having centrifugal weights heavy enough to provide adequate force for gear shifting.

Another object is the provision of a hub having a shell of relatively small dimensions, yet providing ample space for a rugged and strong linkage connecting the centrifugal weights to the planetary transmission.

A further important object is the provision of a multiple-speed hub with automatic shift in which repeated shifting back and forth between two transmission ratios is avoided in all speed ranges if the rotary speed of the hub varies by relatively small amounts only.

With these and other objects in view, the invention in one of its aspects resides in a hub for a bicycle or the like which is mounted on a shaft. A driver member and the hub shell are arranged for rotation about the axis of the shaft, and are connected by an interposed multiple speed transmission which is mounted in the shell. The transmission ratio of the multiple speed transmission may be varied by moving one transmission member relative to another transmission member. At least one, and preferably several centrifugal weights are mounted on the hub shell for rotation therewith, and also for movement relative to the hub shell between respective first and second positions which are adjacent the axis and radially remote from the axis respectively.

At least a portion of each weight is outside the hub shell when the weight is in the second, or remote position. Resilient means urge the weights from the second toward the first position adjacent the axis while centrifugal force tends to move the weights in an opposite direction when the hub shell rotates. Linkage means are interposed between the weights and the movable transmission member for varying the transmission ratio of the transmission response to the movement of the weights between their aforementioned positions. The linkage means include a linkage member which passes through the hub shell and is movable inward and outward of the shell.

Other features and objects of the invention will hereinafter become more fully apparent from the following description of the annexed drawing, which illustrates a preferred embodiment of the invention, and wherein:

FIG. 1 shows a multiple speed hub of the invention in side elevation, and partly in axial section; and FIG. 2 illustrates the hub of FIG. 1 in radial section on the line II—II.

Referring to the drawing in detail, there is seen a partly hollow shaft 1 equipped for fixed attachment to the rear fork of a bicycle in a conventional manner. A cup-shaped driver member 2 fixedly fastened to a drive sprocket 3 is coaxially rotatable on an axial end portion of the shaft at the drive end of the hub.

The dual-speed planetary transmission with which the hub is equipped includes a panet wheel carrier 4 rotatable on the shaft 1 and carrying several integral planet shafts 5 of which only one is visible in the drawing. The axes of the planet shafts 5 are parallel to the axis of the stationary shaft 1 and radially spaced therefrom. They carry respective planet wheels 6.

A sun wheel 7 is rotatably supported on a split block 8. The block is axially slidable in a radial slot of the stationary shaft 1. When the block 8 moves axially in the slot of the shaft 1, the sun wheel 7 is shifted toward and away from a tubular bearing member 9 which is fixedly fastened on the drive end of the shaft 1 and supports the driver member 2.

Teeth 10 on an annular internal face of the bearing member 9 engage the teeth of the sun wheel 7 when it moves toward the drive end of the hub from the illustrated position, and lock the sun wheel to the shaft 1. An internal face of the planet wheel carrier 4 carries similar teeth 12 which lock the sun wheel to the planet carrier 4 in the illustrated position. In all axial positions of the sun wheel 7, the planet wheels 6 simultaneously mesh with the sun wheel 7 and with a ring wheel 2' which is an integral part of the driver member 2.

A cylindrical rod 13 is slidable in the axial bore of the shaft 1. One end of the rod 13 is fixedly attached to the block 8. The other end is attached to a hollow ring member 14 which is axially slidable on the shaft 1, but is secured in a slot of the shaft against rotation. The member 14 has the general shape of the hollow frustum of a cone. A heavy spring 27 in the bore of the shaft 1 tends to move the ring member 14, and the associated elements of the hub toward the drive end.

Two small bearing balls 19, of which only one is seen in the drawing, travel on the internal conical face of the ring member 14 during operation of the hub. Each ball is mounted on a linking rod 16 by means of a partly hollow pin 17. A helical compression spring 18 in the elongated open recess of the pin 17 urges the ball 19 outward of the recess and into contact with the conical face of the member 14.

The rod 16 passes radially outward of the hub shell 15 which is rotatably supported on the shaft 1 in a conventional manner. A centrifugal weight of cast iron or similar heavy material is mounted on the portion of the rod 16 which is outside the shell 15 by means of a transverse pin 22. The weight 20 and the rod 16 are urged inward of the shell 15 by a helical compression spring 21. The spring is coiled about the terminal portion of the rod 16 which projects radially outward from the weight 20. The spring 21 is interposed between a face of the weight 20 and an inner wall of a protective housing 23 which covers the weight 20 and most of the rod 16. The housing 23 is attached to the outside of the hub shell 15.

A plastic bushing 24 which is mounted on the shell 15 has a radial bore in which the rod 16 is guided in a radial path. A portion of the bushing 24 is at least partly received in a corresponding recess of the weight 20 at all times, and engagement between the bushing and the weight further provides guidance for the radial movement of the rod 16 and of the attached weight 20.

Two annular blocking grooves 25, 25' centered on the axis of the shaft 1 are respectively provided near the apex and the base in the conical inner face of the ring member 14. The grooves are of approximately semicircular cross section. In the position of the hub shown in the drawing, the bearing balls 19 are partly conformingly received in the groove 25'.

The output member of the planetary gear transmission, which is designated 26 and includes the ring wheel 2', the planet wheels 6, and the sun wheels 7, is an overrunning clutch of conventional type. Several cylindrical rollers are interposed between an outer face of the planet wheel carrier 4 and an inner face of the hub shell 15 in respective pockets which taper in a common circumferential direction so that the rollers are wedged between the planet wheel carrier and the hub shell when the carrier moves faster than the shell, but release the hub shell when it moves faster than the planet carrier.

The aforedescribed multiple speed hub operates as follows:

The position illustrated is assumed by the weights 20 when they are driven radially outward by centrifugal forces during relatively rapid travel of the bicycle. When the speed of the bicycle is reduced, the action of the spring 21 can move the weights 20 radially inward. During such inward movement the balls 19 must travel over the edge of the groove 25' which form a threshold projecting into the radial path of the sphere, and held in the projecting position by the spring 27. Because of the inclination of that threshold, the force of the spring 21 eventually becomes sufficiently greater than the centrifugal force acting on the weight 20 to liberate the ball 19 from the blocking groove 25', and to move it toward the axis of the shaft 1.

The springs 18 and 27 hold the conical face of the member 14 in engagement with the ball 19 during the movement of the latter so that the member 14 is shifted axially toward the drive end of the hub. The balls 19 eventually drop into the groove 25, and the weight 20 simultaneously abuts against the bushing 24. Movement of the ring member 14 is stopped In the illustrated high-speed position of the hub, the driving torque applied to the sprocket 3 is transmitted to the planet wheels 6 by the ring wheel 2' integral with the driver member 2. The sun wheel 7 is locked to the planet carrier 4 by the teeth 11 of the latter, and the planet wheels 6 are therefore prevented from rotating on their shafts 5. The planet carrier 4 moves with the driver member at the input speed of the sprocket 3, and the movement of the planet carrier is transmitted to the hub shell by the clutch 26.

When the ring member 14 is shifted toward the drive end of the hub in the manner described above, the sun wheel 7 is released from the teeth 11 of the planet wheel carrier 4, and locked by the teeth 10 of the bearing member 9 to the shaft 1. The planet wheels 6 are free to rotate on their shafts 5 in simultaneous meshing engagement with the sun wheel 7, which is being held stationary, and with the ring wheel 2' on the driver member 2. The planet wheel carrier 4 rotates at a speed which is lower than that of the drive sprocket 3, and the hub shell 15 rotates at the slower speed of the planet wheel carrier.

When faster rotation of the hub shell 15 again generates greater centrifugal forces, the balls 19 tend to move out of the blocking groove 25. This outward movement is again retarded by the threshold at the edge of the groove. Shifting from the lower transmission ratio to the higher ratio prevailing in the illustrated condition of the hub thus takes place at a higher rotary speed of the hub shell 15 than downshifting. If the bicycle travels at a speed within the range in which shifting between the several transmission ratios normally occurs, minor speed variations therefore do not cause rapidly repeated shifting back and forth between the two speeds of which the illustrated bicycle hub is capable.

The general speed range in which shifting takes place is readily controlled by suitably balancing the mass of the centrifugal weights 20 against the force of the spring 21. The difference between the speeds at which upward and downward shifting actually takes place is controlled most conveniently by the depth of the grooves 25, 25', but also by the characteristics of the springs 18 and 27.

It should be understood, of course, that the foregoing disclosure relates to only a preferred embodiment of the invention, and that it is intended to cover all changes and modifications of the example of the invention herein herein chosen for the purpose of the disclosure which do not constitute departures from the spirit and scope of the invention set forth in the appended claims.

I claim:

1. A multiple speed hub with automatic speed shift for a bicycle and like vehicle comprising, in combination:
   (a) a shaft having an axis;
   (b) a driver member mounted on said shaft for rotation about said axis;
   (c) a hub shell mounted on said shaft for rotation about said axis;
   (d) multiple speed transmission means mounted in said hub shell and operatively interposed between said driver member and said hub shell for rotating said hub shell at a selected transmission ratio responsive to rotation of said driver member,
      (1) said transmission means including a plurality of transmission members, one of said members being movable relative to another transmission member for varying said transmission ratio;
   (e) a centrifugal weight mounted on said hub shell for rotation therewith about said axis and for movement relative to said hub shell between a first position radially adjacent said axis and a second position radially remote from said axis, at least a portion of said weight being outside said hub shell when said weight is in said second position thereof;
   (f) resilient means permanently urging said weight to move from said second position toward said first position thereof, said weight tending to be moved from said first to said second position by centrifugal force when said hub shell rotates;
   (g) linkage means interposed between said weight and said one transmission member for varying the transmission ratio of said transmission responsive to the movement of said weight between said positions thereof,
      (1) said linkage means including a linking member, said member passing through said hub shell, and being movable inward and outward of said shell; and
   (h) a protective housing mounted on said shell
      (1) said housing covering said weight and a portion of said linkage means when said weight is in said second position thereof,
      (2) said resilient means including a spring member interposed between said housing and said weight.

2. A hub as set forth in claim 1, further comprising blocking means for retaining said weight in said first position against said centrifugal force until said centrifugal force exceeds the urging force of said resilient means by a predetermined amount, and blocking means for retaining said weight in said second position against the urging of said resilient means until the force of said resilient means exceeds the centrifugal force by a predetermined amount, said blocking means each including a threshold member engaging said weight.

3. A hub as set forth in claim 1, further comprising guide means for guiding said weight in a radial path between said positions thereof.

4. A hub as set forth in claim 3, wherein said guide means include a bushing mounted on said hub shell and formed with a radial bore, said one linking member being slidably received in said bore.

5. A hub as set forth in claim 1, wherein said spring is a helical compression spring, and said weight carries a rod member extending radially outward from said weight, said spring being coiled about said rod member.

6. A hub as set forth in claim 1, said linkage means further comprising actuating means for actuating axial movement of said one transmission member responsive to the movement of said one linking member inward and outward of said shell, said one transmission member being axially movable relative to said other transmission member for varying said transmission ratio.

7. A multiple speed hub with automatic speed shift for a bicycle and like vehicle comprising, in combination:
 (a) a shaft having an axis;
 (b) a driver member mounted on said shaft for rotation about said axis;
 (c) a hub shell mounted on said shaft for rotation about said axis;
 (d) multiple speed transmission means mounted in said hub shell and operatively interposed between said driver member and said hub shell for rotating said hub shell at a selected transmission ratio responsive to rotation of said driver member,
  (1) said transmission means including a plurality of transmission members, one of said members being movable relative to another transmission member for varying said transmission ratio;
 (e) a centrifugal weight mounted on said hub shell for rotation therewith about said axis and for movement relative to said hub shell between a first position radially adjacent said axis and a second position radially remote from said axis, at least a portion of said weight being outside said hub shell when said weight is in said second position thereof;
 (f) resilient means permanently urging said weight to move from said second position toward said first position thereof, said weight tending to be moved from said first to said second position by centrifugal force when said hub shell rotates; and
 (g) linkage means interposed between said weight and said one transmission member for varying the transmission ratio of said transmission responsive to the movement of said weight between said positions thereof,
  (1) said linkage means including a linking member, said member passing through said hub shell, and being movable inward and outward of said shell,
  (2) the linkage means further including actuating means for actuating axial movement of said one transmission member responsive to the movement of said one linking member inward and outward of said shell,
  (3) said one transmission member being axially movable relative to said other transmission member for varying said transmission ratio, and
  (4) said actuating means including a conical member coaxially mounted on said shaft for axial movement, said one linking member moving inward and outward of said shell in a radial direction and abuttingly engaging said conical member, said conical member being connected to said one transmission member for movement therewith.

8. A hub as set forth in claim 7, wherein said conical member is hollow and has a conical inner face, said one linking member including a contact portion engaging said inner face, and said motion transmitting means further including means for holding said contact portion in engagement with said inner face.

9. A hub as set forth in claim 8, further comprising annular threshold means on said conical face for yieldably blocking movement of said contact portion along said face responsive to the urging of said resilient means and to said centrifugal force.

10. A hub as set forth in claim 8, wherein said conical face is formed with a plurality of axially spaced annular grooves therein about said axis, said contact portion being adapted to be conformingly received in said grooves.

11. A hub as set forth in claim 10, wherein said grooves are of arcuate cross section, and said contact portion is of substantially spherical shape.

12. A hub as set forth in claim 11, wherein said one linking member is formed with a recess elongated in a direction toward said conical face, said contact portion being partly received in said recess for movement toward and away from said conical face, and a spring member in said recess urging said contact portion toward said conical face.

13. A hub as set forth in claim 7, wherein said linkage means further include a rod member slidably mounted in said shaft, said rod member being secured to said conical member and to said one transmission member.

14. A hub as set forth in claim 13, wherein said multiple speed transmission means includes a planet wheel carrier mounted on said shaft for rotation about said axis and carrying a planet wheel rotatable about a planet axis spaced from the axis of said shaft, a ring wheel connected to said driver member for joint movement, said one transmission member constituting a sun wheel axially movable on said shaft relative to said planet wheel carrier while said planet wheel simultaneously engages said sun wheel and said ring wheel between a position in which said sun wheel lockingly engages said shaft and another position in which said sun wheel lockingly engages said planet wheel carrier, said motion transmitting means axially moving said sun wheel between said positions thereof responsive to said movement of said weight, said multiple speed transmission means further including overrunning clutch means operatively interposed between said planet wheel carrier and said hub shell.

References Cited by the Examiner

UNITED STATES PATENTS

| | | | |
|---|---|---|---|
| 2,133,987 | 10/1938 | Hall et al. | 74—752 |
| 2,218,813 | 10/1940 | Cotterman | 74—752 |
| 2,796,775 | 6/1957 | Gleasman | 74—751 |
| 2,956,443 | 10/1960 | Nelson. | |

DAVID J. WILLIAMOWSKY, *Primary Examiner.*

J. R. BENEFIEL, *Assistant Examiner.*